United States Patent
Sheeran et al.

(10) Patent No.: US 7,168,628 B2
(45) Date of Patent: Jan. 30, 2007

(54) CONTROL VALVE MONITORING

(75) Inventors: Howard Stephen Sheeran, Wodonga (AU); Jeffrey James Watts, Ballarat (AU); Christopher Joachim Bullen, Croydon (AU); Scott Milan, Morphett Vale (AU); Paul Degnan, Cronulla (AU); Timothy Fisher, Loftus (AU)

(73) Assignee: Smart Flow Pty Ltd, New South Wales (AU)

( * ) Notice: Subject to any disclaimer, the term of this patent is extended or adjusted under 35 U.S.C. 154(b) by 62 days.

(21) Appl. No.: 10/474,548

(22) PCT Filed: Apr. 10, 2002

(86) PCT No.: PCT/AU02/00448

§ 371 (c)(1),
(2), (4) Date: Feb. 20, 2004

(87) PCT Pub. No.: WO02/084155

PCT Pub. Date: Oct. 24, 2002

(65) Prior Publication Data

US 2004/0149831 A1    Aug. 5, 2004

(30) Foreign Application Priority Data

Apr. 10, 2001   (AU)   ..................... PR4331
Apr. 10, 2001   (AU)   ..................... PR4332

(51) Int. Cl.
G05D 23/13   (2006.01)
E03B 7/07   (2006.01)

(52) U.S. Cl. .................. 236/12.1; 236/12.15; 137/551; 137/552

(58) Field of Classification Search ............... 236/12.1, 236/12.15, 12.12, 93 R, 94, 91 F; 137/552, 137/551
See application file for complete search history.

(56) References Cited

U.S. PATENT DOCUMENTS 4,406,401 A * 9/1983 Nettro ...................... 236/12.12
4,509,550 A * 4/1985 Monk ......................... 137/551
4,630,940 A   12/1986 Ostertag et al.
4,682,626 A   7/1987 Bergmann
4,941,608 A * 7/1990 Shimizu et al. .......... 236/12.12

(Continued)

FOREIGN PATENT DOCUMENTS

EP    0 297 884 A    1/1989

(Continued)

OTHER PUBLICATIONS

JP 61153421 A [Matsushita Electric Ind Co Ltd], Jul. 12, 1986.

*Primary Examiner*—Chen Wen Jiang
(74) *Attorney, Agent, or Firm*—Tucker Ellis & West LLP

(57) ABSTRACT

The present invention provides a device for monitoring the operation of a control valve (1), which is adapted to supply fluid at a predetermined temperature via an outlet (4). The device includes a sensor (10) adapted to be coupled to the outlet (4) so as to sense the temperature of the fluid. An indication device (16) and a processor (18) are provided. In use, the processor is adapted to determine the temperature of the fluid from the sensor and, provide an indication of this via the indication device.

32 Claims, 12 Drawing Sheets

U.S. PATENT DOCUMENTS

| | | | |
|---|---|---|---|
| 5,174,495 A * | 12/1992 | Eichholz et al. | 236/12.12 |
| 5,535,779 A | 7/1996 | Huang | |
| 5,542,449 A | 8/1996 | Huang | |
| 5,915,415 A | 6/1999 | Huang | |
| 6,442,639 B1 * | 8/2002 | McElhattan et al. | 710/303 |

FOREIGN PATENT DOCUMENTS

| | | |
|---|---|---|
| EP | 0 320 564 A | 6/1989 |
| EP | 0 961 067 A2 | 12/1999 |
| GB | 2 216 313 A | 10/1989 |
| JP | 11037488 A * | 2/1999 |

* cited by examiner

CONTROL VALVE MONITORING

BACKGROUND OF THE INVENTION

The present invention relates to a device for monitoring the operation of a control valve and in particular to a device for monitoring the temperature of fluid supplied by a thermostatic mixing valve.

The present invention also relates to a control valve and in particular to an electronic thermostatic mixing valve.

DESCRIPTION OF THE PRIOR ART

The reference to any prior art in this specification is not, and should not be taken as, an acknowledgment or form of suggestion that the prior art forms part of the common general knowledge in Australia.

Thermostatic mixing valves (TMVs) have been in use for many years to control the temperature of water supplied to a delivery point. TMVs are capable of delivering water at a preset temperature, as well as preventing water flow in the event of the failure of the cold water supply. They are used extensively in Hospitals, Nursing Homes and other Public Health buildings and are designed to protect users against accidental injury through scolding.

Mechanical TMV's operate using a temperature sensitive element, such as a wax or bimetallic element. In use, hot and cold water is supplied to the valve via respective hot and cold inlets. The water mixes inside the valve and then is delivered to a desired location through an outlet. In use the temperature sensitive element is linked to the hot and cold inlets so as to control the flow of hot and cold water into the valve.

If the resulting mixed water temperature is too hot, the temperature sensitive valve element will typically expand (or move in the case of a bimetallic element). This causes the flow of water through the hot water inlet to be reduced and/or the flow of water through the cold water inlet to be increased. This in turn causes a corresponding reduction in the mixed water temperature.

Similarly, if the mixed water temperature falls to low, the temperature sensitive element will contract causing the hot water inlet to be opened further and/or the cold water inlet to be closed further, thereby causing the mixed water temperature to increase. In this manner, the TMV can be used to provide water at a predetermined temperature.

However, the mechanical TMV's have a number of shortcomings. In particular TMV's can occasionally fail resulting in the supply of water outside the desired temperature range. When a TMV does fail there is no external visual or audible indication that the valve has failed. This can therefore result in severe injury if the user is exposed to extreme water temperatures, and in cases where the user may be elderly and frail they may be unable to take evasive action. In the most extreme cases deaths have occurred due to TMV failure.

Accordingly, because of this regular maintenance schedules have been imposed by Health Department Authorities. In addition, there are mandatory monitoring and reporting of TMV performance on a monthly basis in NSW.

However, manual monitoring of valves in this method is extremely time consuming. In addition to this, such manual monitoring will not actually detect catastrophic failure of the valve in advance. Instead, this can only be determined if the valve is not functioning correctly, even so it is possible that an incorrectly functioning valve could be left for many days or weeks before this is detected.

In addition to this, mechanical TMVs have a number of performance limitations. Firstly the mechanical TMV cannot control the mixed water temperature unless the hot water supply temperature is at least 5° C. above the set mixed water temperature.

Secondly in the case in which a wax element is used, the wax element expands and contracts with changes in water temperature and the movement that it generates causes adjustments to the hot and cold water supplies. The small distance in travel results in relatively large surface areas around the valve seats. This makes the TMV susceptible to supply pressure fluctuations and can result in poor temperature control under difficult supply pressure conditions.

Canadian Patent CA-1197593 describes a system for automatically attaining a set output temperature from a faucet. In this system, fluid status sensors are attached to a pipe which is in turn connected to electronically controlled hot and cold taps. In this case, the system will be able to provide a constant output temperature under conditions of constant supply.

However, in this arrangement the pipe is connected directly to the hot and cold supplies. As a result, there may be improper mixing of the hot and cold fluids before the fluid flow reaches the temperatures sensors. This can lead to inaccurate temperature measurements which in turn leads to poor operation of the system. Furthermore, this form of arrangement is typically unable to cope with rapid fluctuations in either one of the hot or cold supplies, due to the poor mixing of the hot and cold fluids.

In addition, to this, the described arrangement requires separate controllers for the hot and cold supplies. This requires the use of two motors, valves and associated control electronics which can reduce the reliability of the valve. Furthermore, this makes operation of the overall control system complicated, in particular to ensure a constant temperature without losing control of the flow, due to the requirement of the system to monitor both increases and decreases in flow for both the hot and cold supplies independently.

Accordingly, this system is unsuitable for use in temperature critical situations, such as in showers in hospitals or the like.

SUMMARY OF THE INVENTION

In a first broad form the present invention provides a device for monitoring the operation of a control valve, the control valve being adapted to supply fluid at a predetermined temperature via an outlet, the device including:

a) A sensor adapted to be coupled to the outlet in use for sensing the temperature of the fluid;

b) An indication device; and, c) A processor coupled to the sensor, the processor being adapted to:

i) Determine the temperature of the fluid from the sensor; and, ii) Provide an indication of the temperature via the indication device.

Accordingly, the present invention provides a device for monitoring the operation of a control valve. This is achieved by having a sensor coupled to the outlet for measuring the temperature of the fluid. An indication device is provided to allow an indication of the temperature to be applied to a user by these devices on board a processor.

Typically, the indication device includes:
a) A store coupled to the processor, the processor being adapted to periodically store an indication of the fluid temperature in the store; and,
b) An output for transferring the indications of the temperature stored in the store to a user.

In this case the device may further include a timer coupled to the processor, the processor being adapted to store the time at which the fluid temperature was determined with each indication of the fluid temperature.

The output is usually a communications device adapted to communicate with a remote processing device, although an output port such as a serial or parallel port may be used.

If the output is a device, it is preferably a Bluetooth enabled communications device.

Alternatively or additionally, the indication device can include an alert unit coupled to the processor, the processor being adapted to
i) Compare the temperature of the fluid to at least one predetermined threshold; and
ii) Determine the valve to be functioning incorrectly in result of an unsuccessful comparison.

The processor is usually further adapted to cause the alert unit to generate an alert if the valve is determined to be functioning incorrectly.

The valve preferably further includes a shut off device, the processor being adapted to activate the shut off device so as to prevent the supply of fluid from the outlet if the valve is determined to be functioning incorrectly.

In this case the processor is preferably adapted to generate an alert if the temperature exceeds a predetermined upper threshold. The processor may also be adapted to generate an alert if the temperature falls below a predetermined lower threshold.

In any event the alert unit is usually adapted to generate one of an audible and visual alert.

One option is for the alert unit to be located remotely to the sensor, which may be in the form of a portable unit adapted to be carried by a maintenance worker, or the like.

As a further option the indication device may include a display, the display being adapted to provide an indication of the fluid temperature.

The device may further include a second sensor for sensing the temperature of the fluid, the processor being further adapted to:
i) Determine the temperature of the fluid from the second sensor;
ii) Compare the temperature of the fluid determined by the first and second sensors; and,
iii) Cause the indication device to generate an indication if the temperatures differ by more than a predetermined amount.

The control valve is usually adapted to receive a supply of hot fluid at a first inlet and a supply of cold fluid at a second inlet, the control valve operating to mix the hot and cold fluids to thereby supply the fluid at the predetermined temperature. Accordingly, the device may further include third and fourth sensors, the third and fourth being adapted to sense the temperature of the hot and cold fluids respectively.

The processor can therefore be adapted to determine that the supply of fluid from the outlet has been turned off when:
a) The temperature of the hot fluid decreases by a predetermined amount; and,
b) The temperature of the cold fluid increases by a predetermined amount.

The control valve is usually a thermostatic mixing valve.

In a second broad form, the present invention provides a system for monitoring the operation of a number of control valves, each control valve being adapted to supply fluid at a predetermined temperature, the system including:
a) A number of monitoring devices, each monitoring device being adapted to monitor the temperature of the fluid supplied by a respective control valve;
b) A communications system; and,
c) A processing system coupled to each monitoring device via the communications system, the processing system being adapted to obtain an indication of the temperature of the fluid from each monitoring device and display this to a user.

In a third broad form, the present invention provides a control valve for supplying fluid at a predetermined temperature, the control valve including:
a) A hot inlet for receiving hot fluid having a temperature equal to or above the predetermined temperature;
b) A cold inlet for receiving cold fluid having a temperature equal to or below the predetermined temperature;
c) A mixing chamber for mixing the hot and cold fluids
d) An outlet coupled to the mixing chamber for supplying fluid at the predetermined temperature;
e) A sensor coupled to the outlet for sensing the temperature of the supplied fluid;
f) A flow controller adapted to control the flow of the hot and cold fluids into the mixing chamber; and,
g) A processor coupled to the sensor, the processor being adapted to:
i) Determine the temperature of the supplied fluid from the sensor; and,
ii) Control the flow controller in accordance with the determined temperature.

The flow controller typically includes a closure member for selectively restricting the flow of fluid into the mixing chamber from the hot and cold inlets.

The closure member is usually continuously movable between a first end position in which the hot inlet is substantially open and the cold inlet is substantially closed, and a second position in which the hot inlet is substantially closed and the cold inlet is substantially open.

The flow controller preferably includes a motor for moving the closure member. In this case, the processor is usually adapted to cause the motor to move the closure member in accordance with the determined temperature of the supplied fluid.

The valve usually further includes a baffle positioned in the mixing chamber upstream of the outlet, the baffle being adapted to cause mixing of the hot and cold fluids in the mixing chamber.

Typically the processor is further adapted to:
a) Compare the temperature of the supplied fluid to at least one predetermined temperature threshold; and,
b) Determine the valve to be functioning incorrectly in response to an unsuccessful comparison.

Accordingly, it will be appreciated that the control valve preferably includes the device for monitoring the operation of a control valve in accordance with the first broad form of the invention.

In a fourth broad form the present invention provides a system for monitoring the operation of a number of control valves, each control valve being adapted to supply fluid at a predetermined temperature, the system including:
a) A number of control valves according to the third broad form of the invention;
b) A communications system;

c) A processing system coupled to each control valve via the communications system, the processing system being adapted to obtain an indication of the temperature of the fluid from each control valve and display this to a user.

BRIEF DESCRIPTION OF THE DRAWINGS

Examples of the present invention will now be described with reference to the accompanying drawings, in which:

FIG. 6 is a graph showing long term variations in the temperature of the TMV of FIG. 1 at turn off and then turn on;

FIG. 7 is a graph showing variations in the temperature of the TMV of FIG. 1 at turn on;

DETAILED DESCRIPTION OF THE PREFERRED EMBODIMENTS

Figure 1:
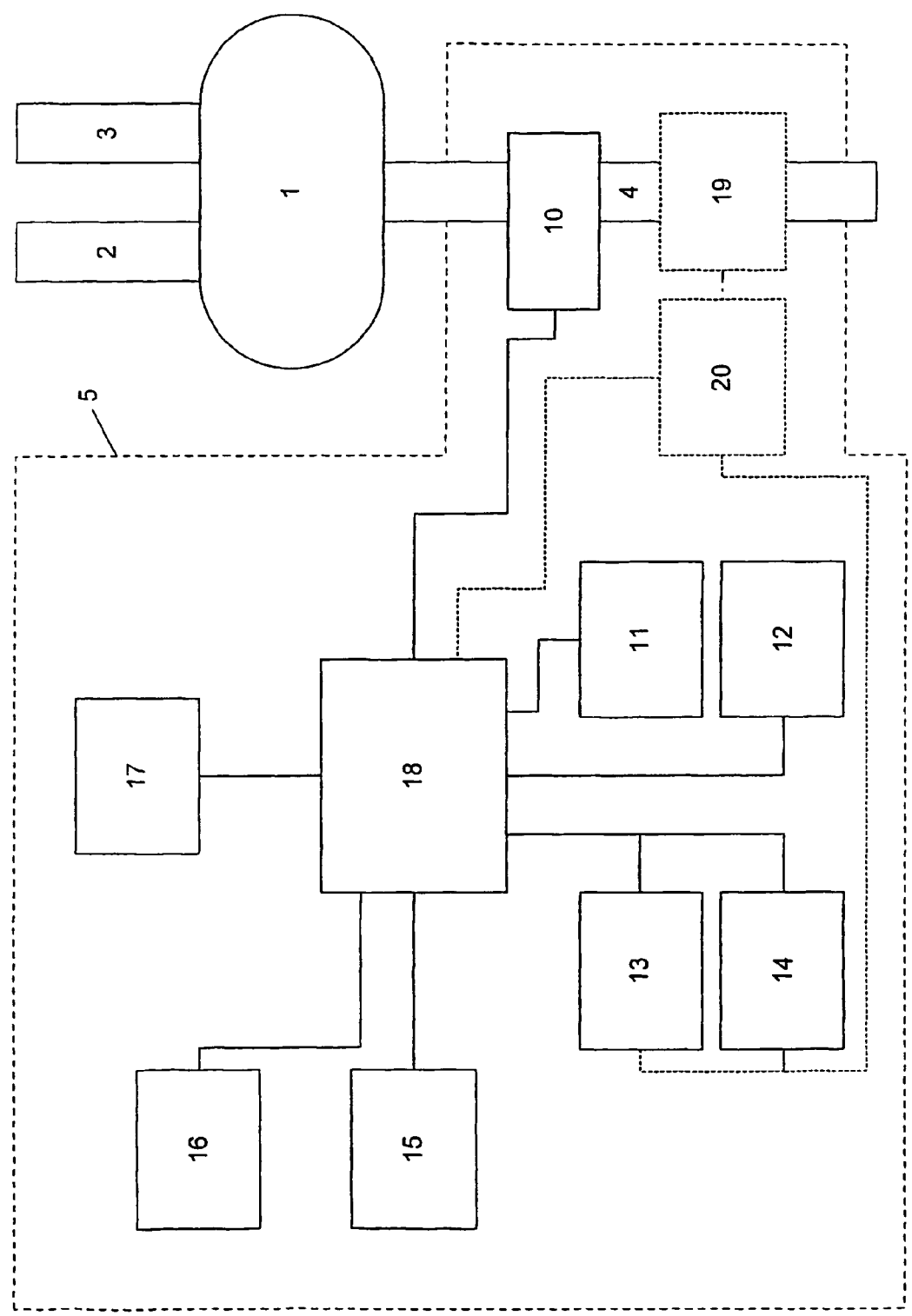
FIG. 1 is a schematic diagram of a first example of a monitoring device according to the present invention.

FIG. 1 shows a monitoring device that is used to monitor the temperature of fluid supplied by a TMV 1.

As shown, the TMV 1 includes a hot and cold water inlets 2, 3 for receiving supplies of hot and cold water respectively, together with a mixed water outlet 4 that provides a supply of mixed water at a predetermined temperature which is typically set by manual adjustment of the valve.

A monitoring device is provided as shown by the dotted line S. In use the monitoring device 5 is coupled to the TMV 1 to allow the temperature of the mixed water flowing from the mixed water outlet 4 to be monitored.

The monitoring device 5 includes a temperature sensor 10, a memory 11, an output 12, first and second power supplies 13, 14, a clock 15, an alert unit 16, and a display 17 which are coupled to a processor 18, as shown.

In use, the monitoring device 5 is powered by the first power supply 13, which would typically be a wired in power supply, such as mains electricity. The second power supply 14 is typically provided so that if first power supply 13 fails, then the device will continue to function as required.

During operation, the temperature sensor 10 operates to generate a signal indicative of the temperature of the mixed water flowing through the mixed water outlet 4. This signal is transferred to the processor 18 that operates to translate the signal into an indication of the mixed water temperature.

Temperature Monitoring

The mixed water temperature can then be provided to the user of the monitoring device using one or more of the following techniques:

1) Displaying the temperature on the display 17;
2) Alerting the user to an abnormal temperature using the alert unit 16; or,
3) Storing temperature data in the memory 11.

In the first case, the indication of the temperature determined by the processor 18 can be displayed on the LCD display 17. This could constantly be updated to provide an indication of the temperature in real time. Alternatively, the temperature could simply be updated periodically, for example every ten seconds or so.

In the second case, the alert unit 16 is used to generate an audible or a visual alarm which, when activated, will alert the user to the fact that the valve is not functioning correctly.

In order to achieve this the processor 18 will operate to compare the current mixed water temperature to a predetermined temperature, which represents the maximum acceptable operating temperature for the TMV 1. This predetermined temperature is typically set to be a couple of degrees higher than the ideal mixed water temperature. Accordingly, if the ideal mixed water temperature is 40° C. then the predetermined temperature is typically 42° C.

In this case, if the processor 18 determines that the current mixed water temperature is above the predetermined temperature, the processor 18 activates the alert unit 16, alerting the user that the mixed water temperature is too hot.

In the third case, the processor 18 obtains an indication of the current time from the clock 15 and then stores this together with an indication of the current mixed water temperature in the memory 11. This operation is performed periodically, for example every ten seconds, depending on the current legal monitoring requirements. As a result, the memory 11 contains a list of mixed water temperatures together with an indication of the time at which these temperatures were taken. This temperature data can be downloaded to a remote processing device via the output 12.

The output 12 may take any one of a number of forms depending on the circumstances. Thus, for example, the output 12 may be a parallel or serial cable port which would allow a remote processing unit, such as a hand held PC, palm-pilot, lap-top, or the like to be coupled directly to the processor 18. Alternatively, the output 12 may comprise of a Bluetooth transceiver, an infra-red port, a modem, or the like which would allow communication with a remote processing unit which is equipped with corresponding Bluetooth, infra-red, or modem capabilities.

From the above, it will be appreciated that the different display techniques each have different benefits.

Thus, in the case of a TMV used in a shower for example, the display 17 ensures that a user of the shower can view the temperature of the mixed water before entering the shower. On the other hand, the alert unit 16 can alert the user to the fact that the TMV 1 is functioning incorrectly, thereby warning the user not to enter the shower.

In addition to this, the temperature data stored in the memory 11 is available for download to a remote processing unit for subsequent analysis, such as examining for variations in mixed water temperature. The temperature data stored in the memory 11 can also be submitted to the health department authorities for example, allowing the authorities to confirm that the TMV is functioning correctly.

Accordingly, in order to ensure that the data is correct, an electronic lock may be placed on the recorded temperature data to prevent retrospective tampering with recorded results. This could be done as the data is initially written into the memory 11, or when the data is downloaded onto a remote processing system.

Persons skilled in the art will appreciate that the previous example shows three different ways in which the mixed water temperature can be provided to the user.

It possible for the monitoring device 5 to include only one of the three described techniques (ie only one of the alert unit 16, the display 17 and the memory 11), depending on the circumstances in which the monitoring device 5 is to be used. However, providing all three techniques gives some degree of redundancy, as well as ensuring that the user is made aware of any failure.

A number of variations to these temperature indicating techniques are also available, as will now be described.

Automatic Shut-Off

In the event that a fault should develop in the valve, the provision of an alert itself may not be sufficient to prevent individuals being burnt. In particular, if the user of the valve is elderly or the like, they may be unable to avoid being burnt in the event that the valve fails, even if an alert is generated.

Accordingly, the monitoring system can optionally be provided with a shut off system that is adapted to halt the flow of fluid from the valve outlet 4 in predetermined circumstances.

The automatic shut off is implemented using a failure detection system 20, shown in dotted lines, and which is coupled to the first and second power supplies 13 and 14, the processor 18, and a flow control 19. In use, if the processor 18 determines if the mixed water temperature is outside normal operating parameters, such as if the mixed water temperature is too hot, as described above. In the event that an abnormal temperature is determined, this can be used to activate the failure detection system.

In the event that the failure detection system is activated the failure detection system 20 operates the flow control 19 causing the flow of water from the mixed water outlet 4 to be stopped, thereby preventing injury to a user of the TMV.

Accordingly, it will be appreciated that the processor may be adapted to activate the failure detection system 18 when the alert unit 16 is activated as described above, because for example the mixed water temperature is too high.

However, in addition to this, the failure detection system may be adapted to detect other failures with the monitoring electronics, and again shut of the valve in these circumstances. In order to achieve this, the processor 18 can be adapted to generate an interrupt at predetermined time intervals. If this interrupt is not detected by the failure detection system 20, then the failure detection system determines that a fault has occurred and operates the flow control 19 to stop the flow of water from the outlet 4.

The failure detection system is also coupled to the first and second power supplies 13, 14. Should the primary power supply 13 fail this is detected by the failure detection system 20. It will be appreciated that if both the first and second power supplies were to fail, then it would no longer be possible for the control electronics to operate and accordingly, the mixed water temperature could no longer be controlled.

Thus, in one example, in order to prevent this happening, if the power supply 13 fails then the second power supply 14 is activated. At this time, the failure detection system detects the failure of the first power supply 13 and activates the flow control 19 to stop the flow of water from the outlet 4. This is done to prevent the TMV being operated when both the first and second power supplies have failed which could lead to undesirable mixed water temperatures not being detected. Accordingly, the second power supply 14 need only used for a sufficient duration of time to allow the mixed water flow from the outlet 4 to be shutdown thereby preventing injury to the user of the TMV 1.

In a second example additionally or alternatively, the flow controller 19 ca be adapted to operate in a default closed position. In this case, the flow controller, which may be formed from a solenoid or the like, is arranged so that if no power is applied to the flow controller the flow controller defaults to a closed position. Accordingly, should both the power supplies 13, 14 fail, power will no longer be supplied to the flow controller causing it to revert to a closed position, thereby shutting off the flow of water.

A further option is for the flow controller to include a temperature sensor, with the failure detection system being adapted to detect a failure and shut off the flow controller 19 should an excessive mixed water temperature be detected. The excessive mixed temperature would be set higher than the thresholds used by the processor 18 to, for example, 45° C.

Ideal Mixed Water Temperature

Optionally an ideal mixed water temperature may be set. This is required because the ideal water temperature required will vary depending on the circumstances in which the TMV 1 is used. Thus, for example, in a neo-natal ward at a hospital, the ideal mixed water temperature may be 38° C., whereas in the majority of other wards the ideal temperature may be 42° C.

In order to ensure that the correct temperature is used, the ideal temperature (and hence the predetermined temperature or predetermined temperature ranges) can be set manually.

In a first example, the monitoring device 5 itself is used to define the ideal mixed water temperature during part of the installation procedure. In this case, once the mixed water temperature of the TMV 1 has been set manually, the TMV is operated for a period of time to ensure a stable mixed water temperature. This temperature is then stored in the memory 11 for example via the use of a "Store Set Temperature" button (not shown), for use as a subsequent ideal reference temperature. Accordingly, when the processor compares the measured mixed water temperature to a predetermined temperature, the predetermined temperature would be set to the stored set temperature +2° C.

In a second example, the ideal mixed water temperature could be set to a predetermined temperature. In this case, an internal switch (not shown) could be used to select a one of a number of ideal mixed water temperatures. These different ideal mixed water temperatures may be defined in accordance with government rules, for example, so that a different switch position could be used to set the ideal mixed water temperature to the temperature required by law. Thus for example, there may be a 38° C. setting for installation in a neo-natal unit, and a 42° C. setting for installation at other locations.

Furthermore, in addition to determining if the mixed water temperature is too hot, the processor 18 may also be adapted to determine if the mixed water temperature is too cold. In this case, the processor must be adapted to compare the mixed water temperature to a predetermined temperature range. Again this temperature range will typically be set based on the ideal mixed water temperature, usually using the ideal mixed water temperature ±2° C. for example. Accordingly, for an ideal mixed water temperature of 40° C., the temperature range is typically set to 38–42° C.

In this case, if the mixed water temperature falls outside the predetermined range, the processor 18 activates the alert unit 16, alerting the user that the mixed water temperature is too hot or too cold. In this case, the alert unit may generate different tones, or a different visual indication depending on whether the water temperature is too high or too low.

In order for this to function correctly, it is preferable for the processor to be able to determine whether the TMV 1 is currently in use. This is because if the TMV 1 is switched off, then with no water flowing through the TMV 1, the temperature of any water remaining in the TMV 1, and hence the temperature of the mixed water outlet 4 will fall. In this case, the processor 18 would detect that the mixed water temperature has fallen to below the predetermined temperature range and cause the alert unit 16 to generate an alert.

In order to overcome this, the monitoring device can be fitted with a flow sensor (not shown) which is capable of determining whether water is flowing through the TMV. In this case, when the flow of water through the TMV 1 ceases, this is detected by the processor 18, which ensures that the alert unit 16 is not activated when the temperature falls outside the predetermined range.

It will be appreciated that in this case, the processor 18 can also be adapted to stop recording the mixed water temperature in the memory 11, to thereby ensure inaccurate data is not recorded. Alternatively the processor 18 could continue to record the mixed water temperatures storing these together with an indication of the on/off status of the TMV, thereby allowing the users of the system to monitor usage of the TMV.

Temperature Comparison

In addition to determining if the mixed water temperature is too hot, the processor 18 may be adapted to alert the user, and even shut the TMV 1 off using the flow control 19 if the mixed water temperature is too cold. In this case, the processor must be adapted to compare the mixed water temperature to a predetermined temperature range. Again this temperature range will typically be set based on the ideal mixed water temperature, usually using the ideal mixed water temperature ±2° C. for example.

Accordingly, for an ideal mixed water temperature of 40° C., the temperature range is typically set to 38–42° C.

In this case, if the mixed water temperature falls outside the predetermined range, the processor 18 activates the alert unit 16, alerting the user that the mixed water temperature is too hot or too cold. In this case, the alert unit may generate different tones, or a different visual indication depending on whether the water temperature is too high or too low.

Again a signal may also be sent to the failure detection system 20 to stop the flow of mixed water using the flow controller 19.

Flow Detection

In order for the control electronics to function correctly, it is preferable for the processor to be able to determine whether the TMV 1 is currently in use. This is because if the TMV 1 is switched off, then with no water flowing through the TMV 1, the temperature of any water remaining in the TMV 1, and hence the temperature of the mixed water outlet 4 will fall.

In this case, the measured mixed water temperature will gradually decrease over time. As a result, the mixed water temperature will eventually fall outside the predetermined temperature range causing the processor 18 to activate the alert unit 16 to generate an alert.

In order to overcome this, the monitoring device can be fitted with a flow sensor (not shown) which is capable of determining whether water is flowing through the TMV. In this case, the processor 18 detects when the flow of water through the TMV 1 ceases.

Accordingly, the processor 18 ensures that the alert unit 16 is not activated when the temperature falls outside the predetermined range.

It will be appreciated that in this case, the processor 18 can also be adapted to stop recording the mixed water temperature in the memory 11, to thereby ensure inaccurate data is not recorded.

Alternatively the processor 18 could continue to record the mixed water temperatures storing these together with an indication of the on/off status of the TMV, thereby allowing the users of the system to monitor usage of the TMV.

Remote Alert Unit

In the above described example, the alert unit 1 is shown as part of the monitoring device 5. However, alternatively the alert unit 16 could be located remotely to the monitoring device. In this case, the alert unit 16 will be coupled to the processor 18 via a communication system, such as a Bluetooth, GSM, GPRS, pager, modem connection or the like. This would allow the alert unit 16 to be provided to a maintenance engineer, or the like so that the maintenance engineer can be automatically called out to fix the TMV should a fault arise.

TMV Identification

In the above example, if temperature data relating to a number of different TMVs 1 is to be downloaded and analysed at a central location, it is important to be able to identify the TMV 1 to which any given set of temperature data relates. Accordingly, the memory 11 of each monitoring device is typically programmed with a valve identification number that allows each valve to be uniquely identified. Any data recorded in the memory 11 will then be referenced to the valve identification number allowing the file to be identified.

In addition to this, a valve location code may be provided in the memory 11. This may take the format of for example, WW-L2 indicating that the valve is located in the west wing on the second floor. Again, this information could be associated with the memory 11 thereby ensuring that the valve can be easily located.

It will be appreciated that this is particularly advantageous if the alert unit 16 is used to alert a maintenance worker to incorrectly functioning TMV. This would allow the alert displayed on the alert unit 16 to include an indication of the TMV identity and its location.

Multiple Sensors

Figure 2:
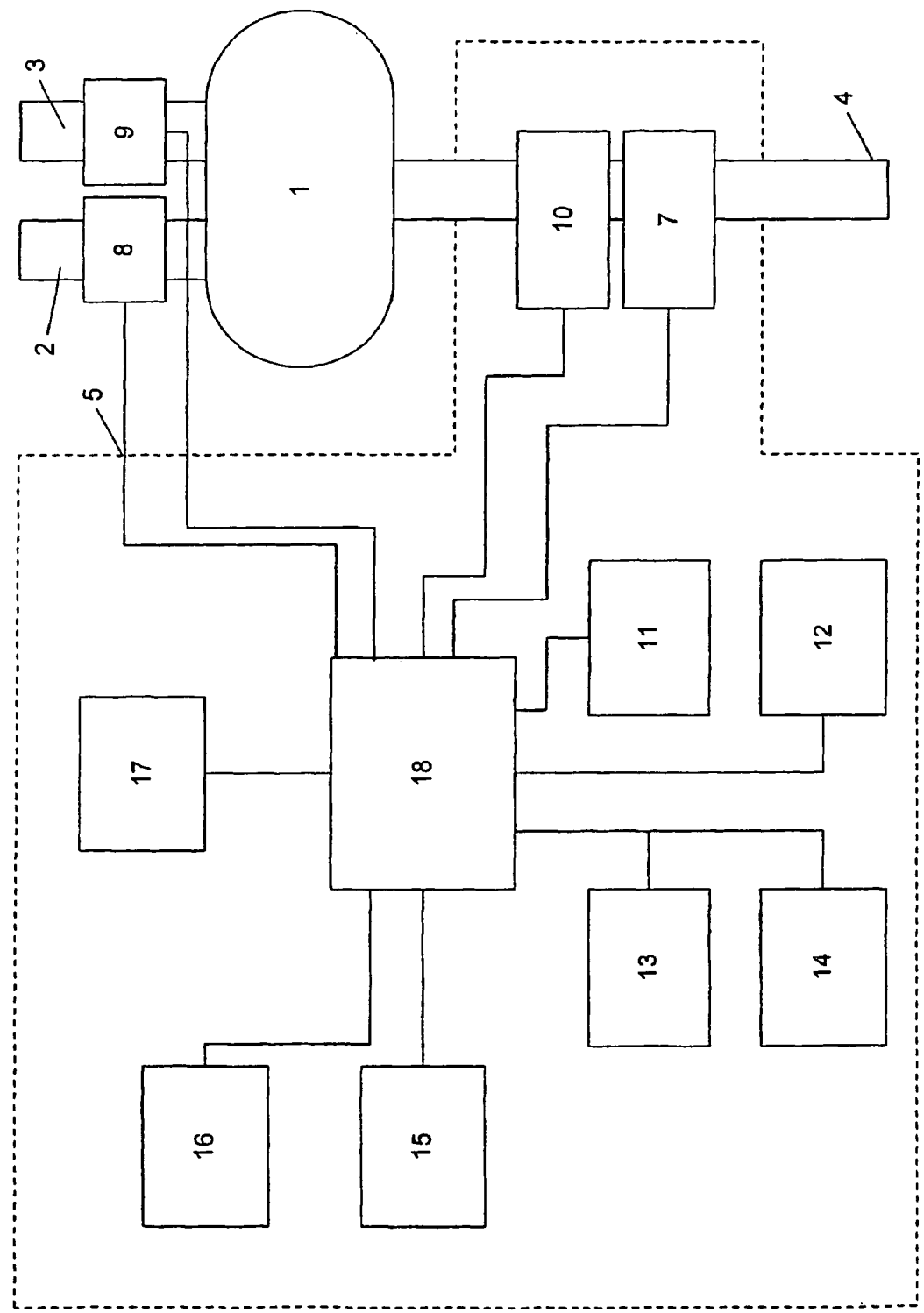
FIG. 2 is a schematic diagram of a second example of a monitoring device according to the present invention.

An example of an alternative monitoring device 5 is shown in FIG. 2. In this example, similar reference numerals indicate similar elements to those shown in FIG. 1.

As shown in FIG. 2, the monitoring device 5 has been modified by the addition of second, third and fourth temperature sensors 7, 8, 9.

In this example, the temperature sensor 7 is also used to monitor the mixed water temperature at the mixed water outlet 4, in addition to the temperature sensor 10. In addition to recording the mixed water temperatures indicated by both the sensors 10, 7 this allows the processor 18 to compare the temperature readings obtained by the temperature sensors 10, 7.

In this case, the processor 18 compares the results to each other to see if there is any disagreement in the measured temperature. If there is a difference in the measured temperatures which is greater than a predetermined threshold, typically ±2° C., then this indicates that there is a fault with one of the sensors 10, 7. Accordingly, an alert can be generated using the alert device 16, indicating that there is a fault with the monitoring device.

If this occurs, the monitoring device will continue to monitor the temperatures obtained by each of the sensors 10, 7 as it will not necessarily be aware of which temperature sensor is not functioning correctly. However this can easily be determined by a maintenance worker once the worker has been alerted to the fault by the alert device 16.

In addition to this, the processor 18 can monitor the temperature of the hot and cold water supplied to the hot and cold water inlets 2,3 using the temperature sensors 8, 9, respectively. Again, this information can be stored in the memory 11 by the processor 18. This allows operators and designers of the TMV 1 to monitor the valve performance by comparing the obtained mixed water temperature to see how this varies depending on changes in the temperature of the hot and cold water supplies 2, 3.

As a further option, the third and fourth temperature sensors 8, 9 can be used to determine the on/off status of the TMV, thereby overcoming the need to use a separate flow sensor. This can be achieved because when the TMV is not in operation, hot and cold fluid no longer flows into the hot and cold water inlets 2,3. As a result, after the TMV 1 has been shut off the temperature of the hot and cold inlets decrease and increase respectively. Accordingly, the processor 18 can be adapted to monitor for changes in the temperature of the hot and cold inlets, using these temperature changes to determine the current on/off status of the TMV.

Research into the behaviour of the hot and cold water supply temperatures when flow through the valve is stopped showed unique and consistent behaviour when compared to an operational valve. When flow is stopped the hot water supply temperature drops dramatically while the cold water temperature rises quite significantly. The mixed water temperature remains quite stable for a prolonged period but may dip below or even peak just above the target temperature.

Accordingly, this can be used to detect cessation of flow of an activated valve. Likewise when flow is reactivated after a period of no flow the hot water temperature dramatically rises while the cold water temperature dramatically drops. Again this can be used to detect the opening of an inactive valve.

Figure 3:
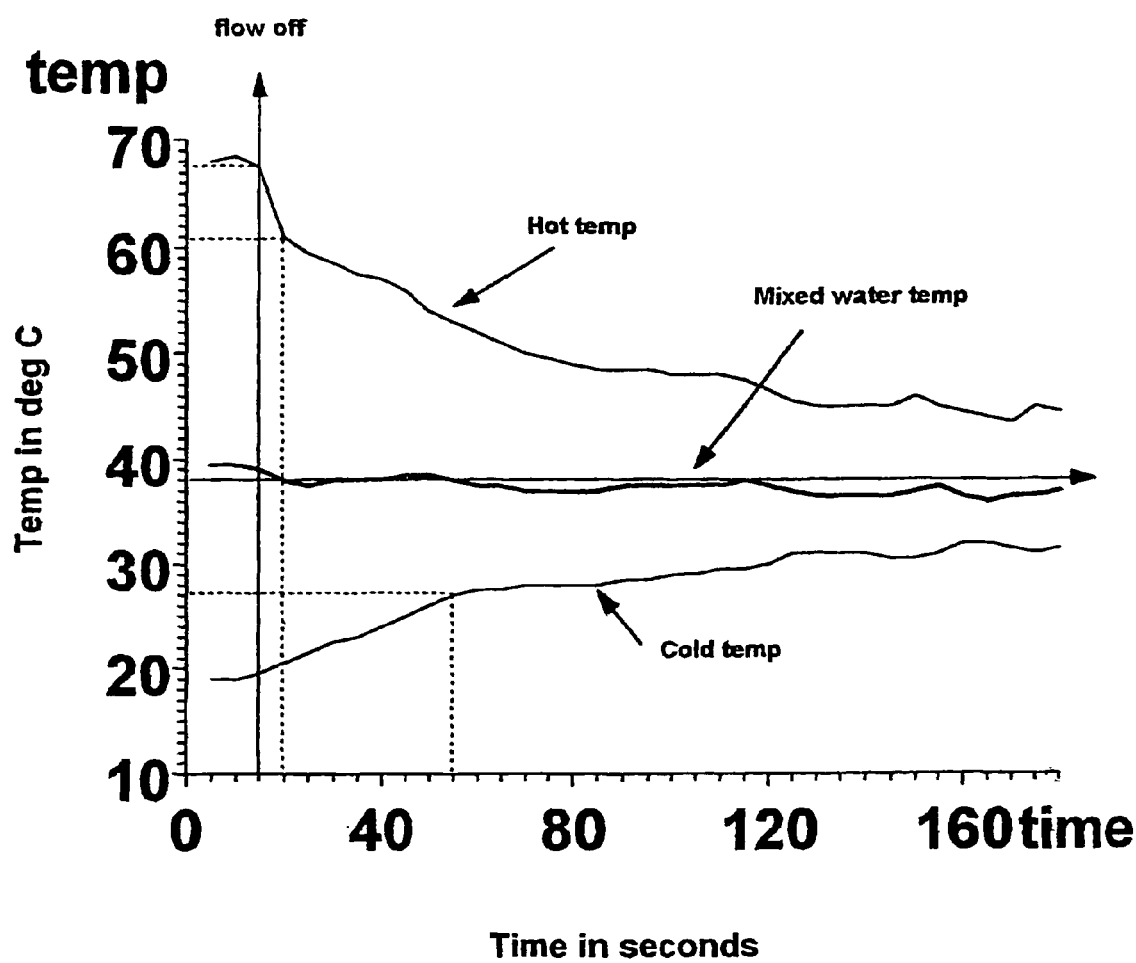
FIG. 3 is a graph showing long term variations in the temperature of the TMV of FIG. 1 at turn off.
Figure 4:
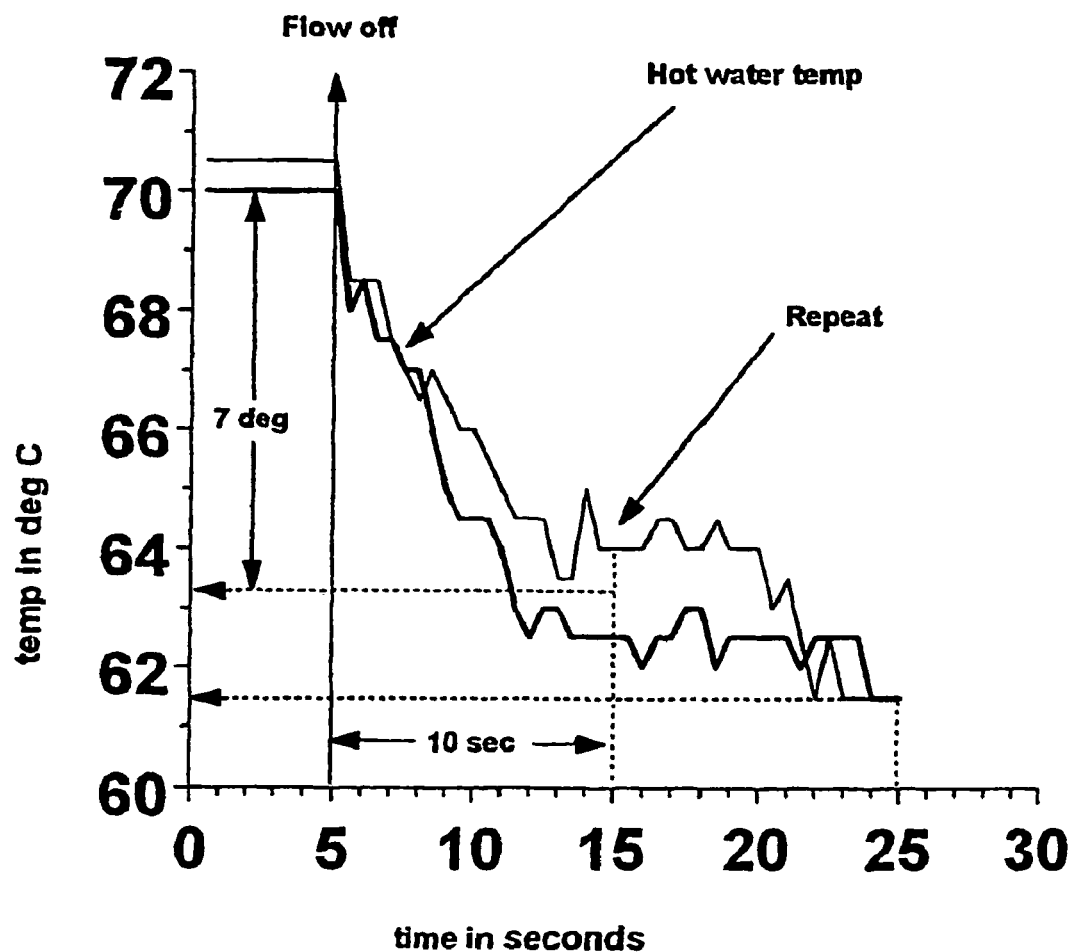
FIG. 4 is a graph showing short term variations in the temperature of the hot water inlet of the TMV of FIG. 1 at turn off.
Figure 5:
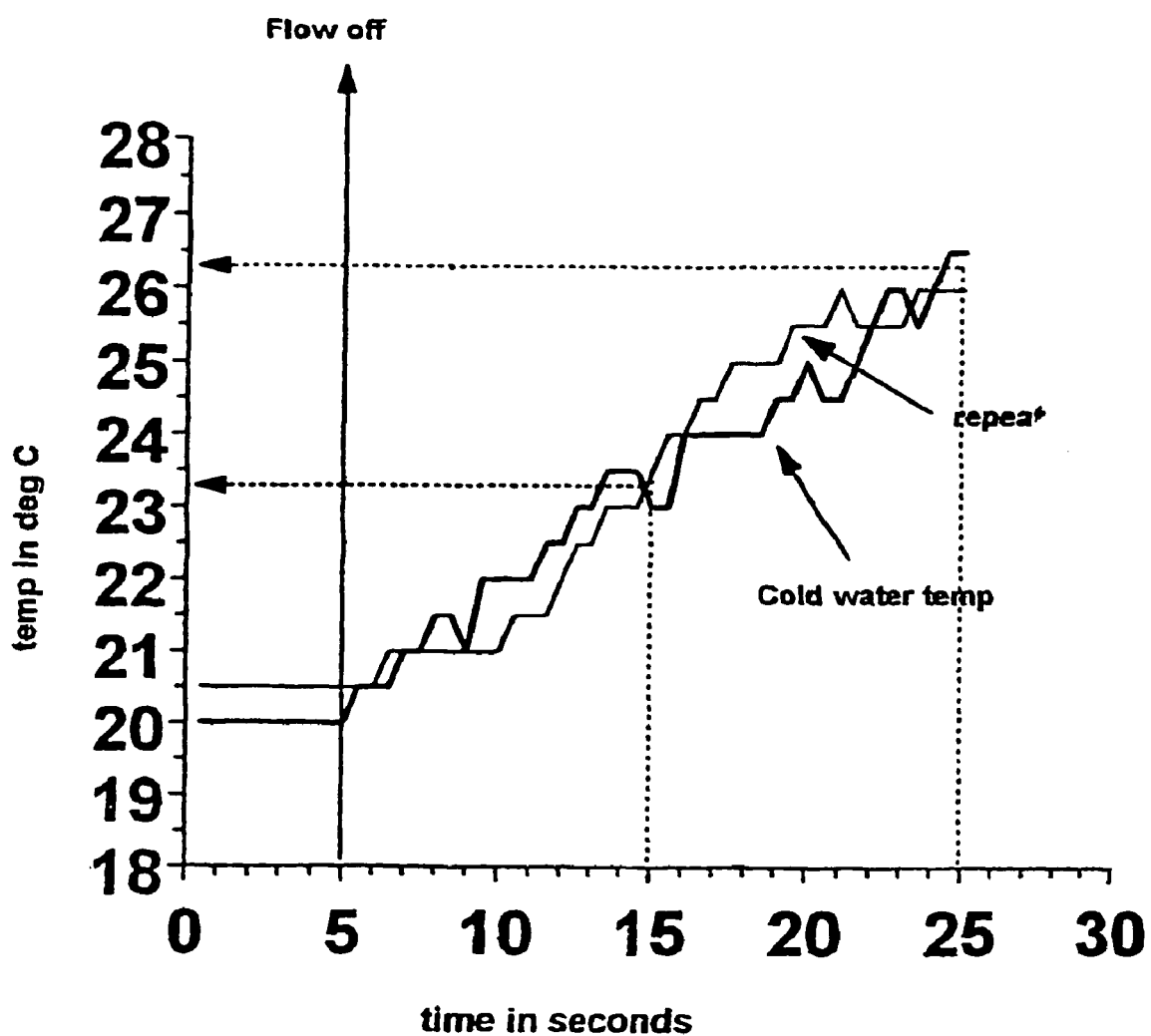
FIG. 5 is a graph showing short term variations in the temperature of the cold water inlet of the TMV of FIG. 1 at turn off.
Figure 6:
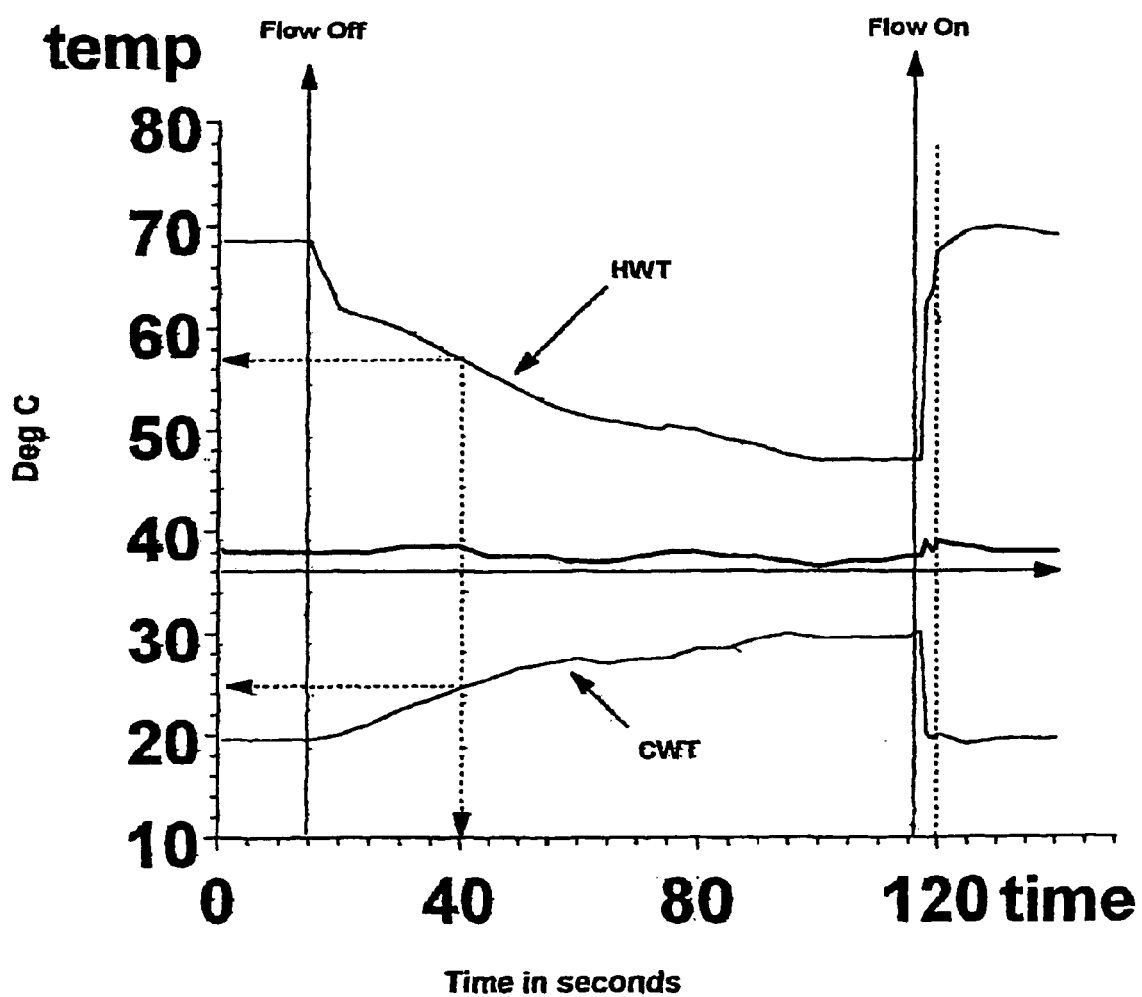
Figure 7:
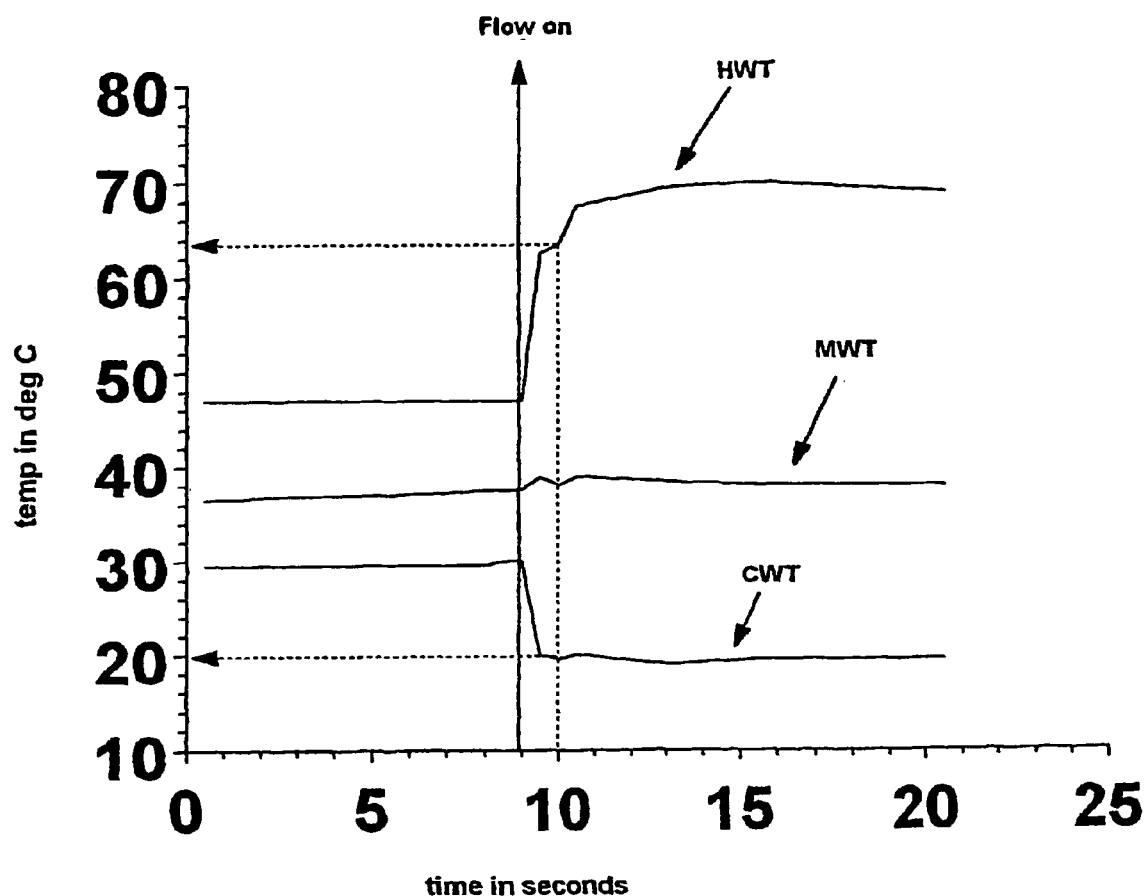

The long turn temperature behaviour at turn off is shown in FIG. 3 with the short term hot and cold water inlet temperature changes being shown in FIGS. 4 and 5 respectively. In addition to this the temperature response at flow off then on is shown in FIG. 6, with the response at turn on only being shown in FIG. 7.

From this it can be determined that the rate of change in temperature for both the hot and cold inlets is determined by the difference between the supply temperature and the mixed water temperature. The greater the difference between the supply temperature and the mixed water temperature the greater the rate of change at turn off.

Accordingly, the processor 18 uses the temperature sensors 8,9 to monitor the difference between the temperature of the hot and cold water inlets 2,3.

If the differences in the supply temperatures change, and meet the model of change of flow state, then the operational status of the TMV will be determined to change from on to off to on respectively.

Thus when the TMV is operational and there is a change in the difference between the hot and cold temperatures the processor will determine that the TMV has been turned off.

Figure 8:
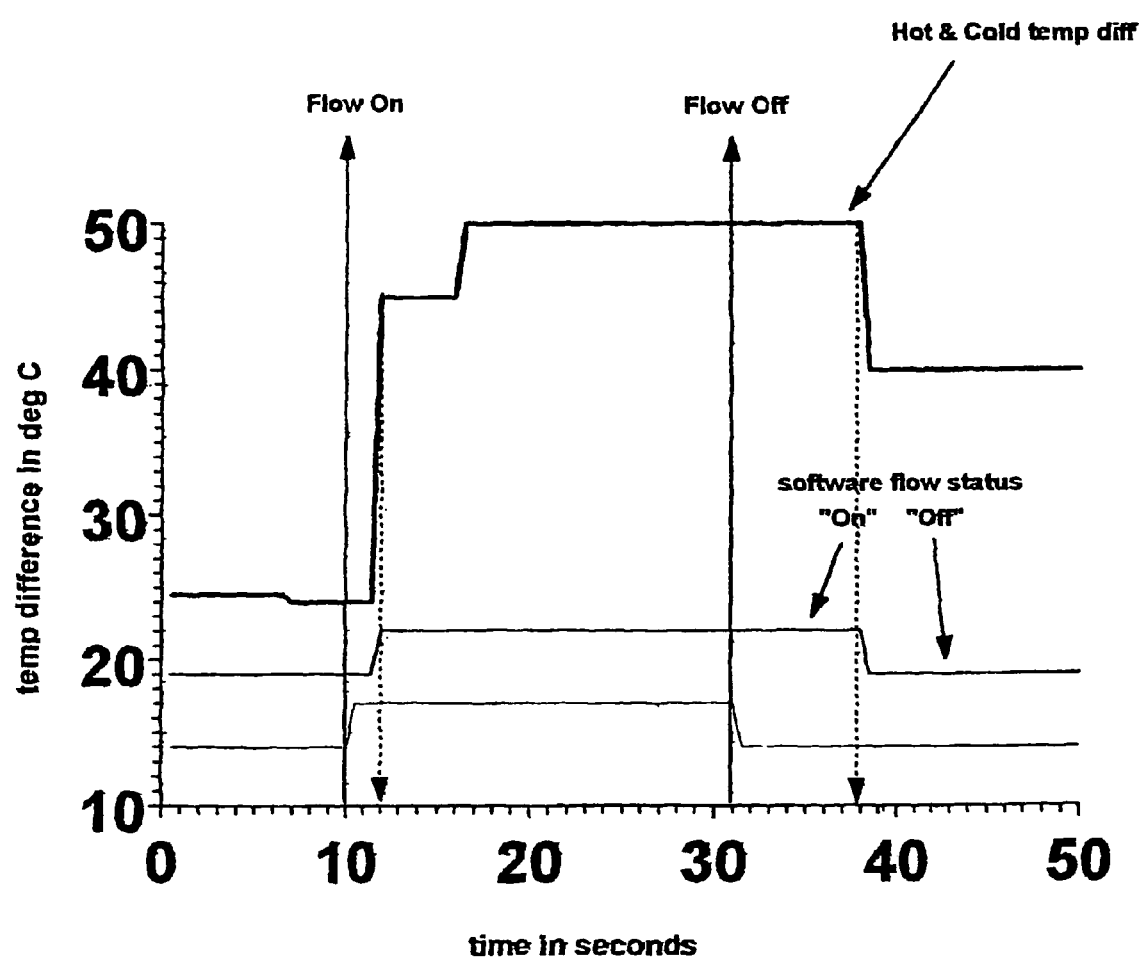
FIG. 8 is a first example of a graph showing the response of the processor of the TMV of FIG. 1 to determine the on/off status of the TMV.

The results achieved by the processor 18 are illustrated in FIG. 8 which shows the ability of the processor 18 to determine the state of actual flow by monitoring the difference in temperature between the hot and cold water inlets 2,3.

Figure 9:
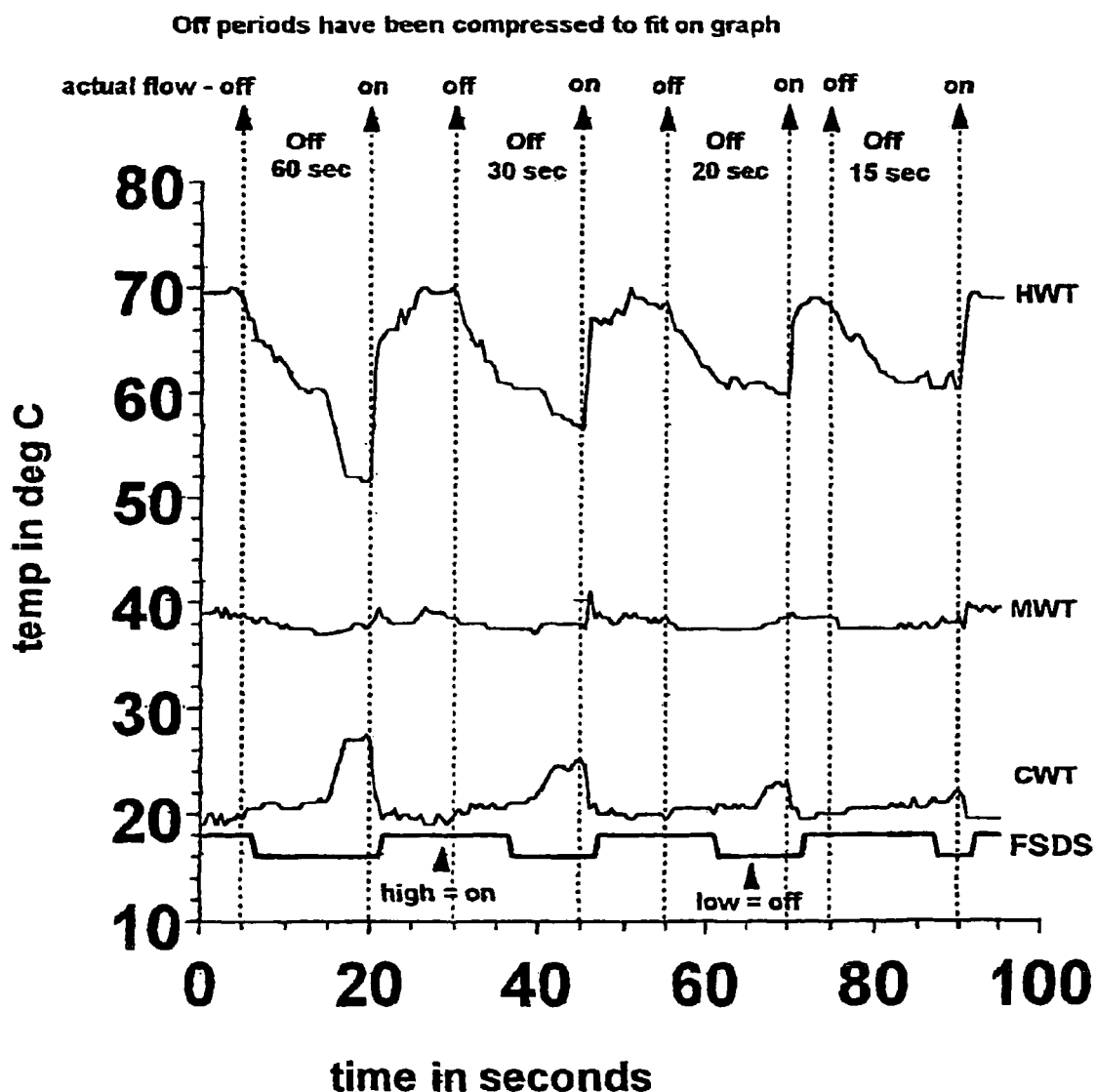
FIG. 9 is a second example of a graph showing the response of the processor of the TMV of FIG. 1 to determine the on/off status of the TMV.

A second example is shown in FIG. 9, which illustrates the ability of the processor 18 to determine the flow status of the valve during a period of frequent use. This is the most critical performance requirement of the software. This test includes periods of flow on and off with actual flow off conditions of 60 seconds, 30 seconds, 20 seconds and 15 seconds.

It should be noted that any period of less than 15 seconds can be discounted due to negligible changes in the mixed water temperature. The shorter the duration of the flow off period the more difficult it is for the software to detect a change in the flow condition.

In addition the monitoring the temperature of the hot and cold water inlets 2,3 a secondary flow "on" switch can also be implemented. This secondary switch is triggered by the mixed water temperature rising by more than 2° C. above the ideal mixed water temperature while the processor has determined that the TMV is in the "Off" state.

It will be appreciated that if there is no water flow through the valve then the mixed water temperature must decrease over time, so any significant increase in the mixed water temperature must indicate flow. This secondary switch acts as a backup for the primary flow switch detection system to prevent the delivery of hotter than target temperature mixed water should the flow detection software fail.

As mentioned in the example above, it is not necessary to provide the alert unit 16, the display 17 and the memory 11. Instead, alternatively only one of these devices may be provided. Furthermore, whilst the present example describes the use of second third and fourth sensors 7, 8, 9, it is possible to provide a system which includes only the additional second sensor, or only the additional third and fourth sensors, depending on the TMV monitoring requirements.

Monitoring Multiple TMVs

Figure 10:
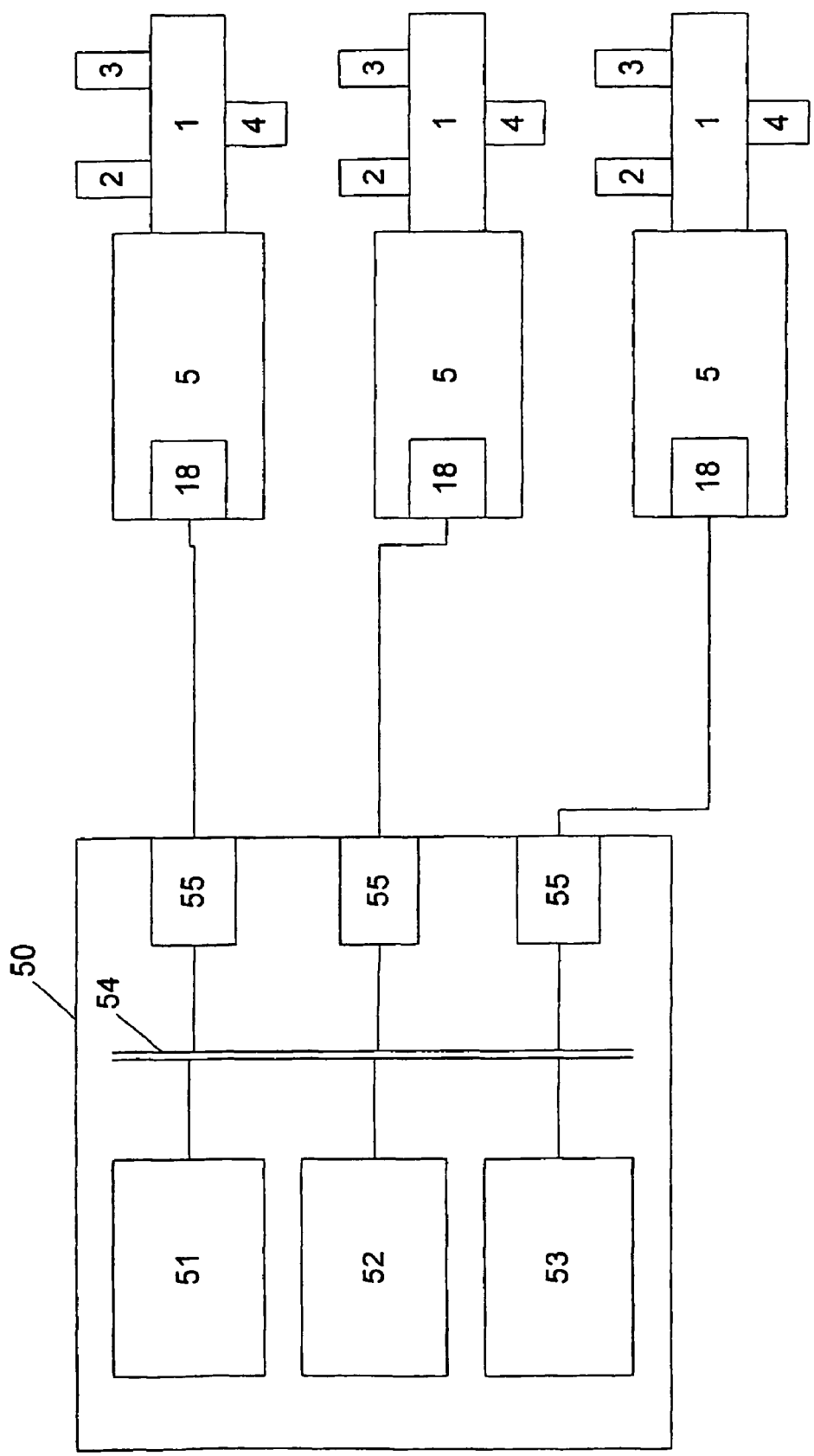
FIG. 10 is an example of a system for monitoring the operation of a number of TMVs according to the present invention.

An example of a monitoring system for monitoring a number of TMVs is shown in FIG. 10. As shown, a respective monitoring device 5 is provided for each of the TMVs. The monitoring device may be a device as shown for example in FIGS. 1 and 2.

The monitoring devices 5 are then coupled to a processing system 50 via the processors 18, as shown. The processing system 50 typically includes a processor 51, a memory 52 and an input/output device (I/O device) 53 which are coupled together via a bus 54. Also coupled to the bus 54 are a number of inputs 55 that are used for connecting the processing device 50 to the monitoring devices 5.

The connections between the processing system inputs 55 and the processors 18 may be hard wired, or may be wireless for example through the use of an infra-red, Bluetooth connection, or the like.

Accordingly, this allows each monitoring device 5 to transfer temperature data stored in the memory 11 to the processing system. The processing system can then store the temperature data in the memory 52 thereby insuring that temperature data is available at a central location for each TMV 1.

This in turn allows the processor 51 to monitor the temperature data for each TMV 1 and alert user of the system if the anomalous data is located. This may occur for example if the temperature data indicates that the temperature of the mixed water outlet is outside the above mentioned predetermined operating temperature range. In addition to this, the information can be displayed on the I/O device 53 to be viewed manually.

It will be appreciated that the processing system 50 could implement database software designed to:

1) Manage an installation of a small or large number of TMVs
2) Collect recorded data to a central database
3) Process collected data
4) Manage the data
5) Store the data in an organised manner for future reference
6) Report recorded data in a number of different formats as required It will be appreciated that the database software could also be designed to keep a record of the maintenance regime of each individual valve. The periodic maintenance of TMVs in public buildings must be done according to Health Department Regulations. Records of maintenance procedures carried out on individual valves could be included in the data base. The software would also be capable of alerting staff when maintenance is due on an individual valve.

As many larger facilities which use TMVs, such as hospitals or the like already have integrated building monitoring systems, the monitoring system described above with respect to FIG. 3 may be integrated into an existing building monitoring system to maintain a central monitoring point.

It will be realised that whilst the above described examples have been described with respect to TMVs, the monitoring device of the present invention may be used to monitor the operation of any control valve which operates to control the temperature of an output fluid.

Electronic Control

The monitoring device can also be adapted for use with specifically designed TMVs to allow the TMV to be electronically controlled TMV, as will now be described with reference to FIG. 11. In this example, similar reference numerals indicate similar elements to those shown in FIGS. 1 and 2. As shown, the electronically controlled TMV 1 includes a hot and cold water inlets 2, 3 for receiving supplies of hot and cold water respectively, together with a mixed water outlet 4 that provides a supply of mixed water at a temperature which is controlled using a motor 6A.

Control electronics are provided to allow the temperature of the mixed water flowing from the mixed water outlet 4 to be monitored and controlled.

The control electronics include a motor controller 6, first, second and third temperature sensors 10,8,9, a memory 11, an output 12, first and second power supplies 13, 14, a clock 15, an alert unit 16, and a display 17, which are coupled to a processor 18, as shown. A failure detection system 20 is also provided and this is coupled to the first and second power supplies 13 and 14, the processor 18, and a flow control 19.

In use, the control electronics are powered by the first power supply 13, which would typically be a wired in power supply, such as mains electricity. The second power supply 14 is typically provided so that if first power supply 13 fails, then the device will continue to function as required.

During operation, the first temperature sensor 10 operates to generate a signal indicative of the temperature of the mixed water flowing through the mixed water outlet 4. This signal is transferred to the processor 18 that operates to determine the mixed water temperature and then use this to control the operation of the valve using the motor 6A and the motor controller 6.

Thus, it will be appreciated that this system therefore corresponds to a modification of the monitoring system of FIGS. 1 and 2, in which the monitoring system is adapted to additionally control the temperature of the water flowing from the outlet. The manner in which this is achieved will now be described with reference to FIGS. 12 and 13, which show the internal workings of the TMV 1.

As shown, the TMV 1 includes a mixing chamber 30 within which is located a baffle 31. The hot and cold water inlets 2, 3 cooperate with the mixing chamber 30 so that hot and cold water can flow into the mixing chamber 30 via the hot and cold water ports 32, 33.

The flow of hot and cold water through the ports is controlled using a valve shuttle 34. The valve shuttle is movable between two extreme positions in which one of the hot or cold ports 32, 33 are fully blocked. Thus, when the valve shuttle 34 is moved to the left as shown by the arrow 35 in FIG. 3, the valve shuttle will block more of the hot water port 32. As a result, the flow of hot water into the mixing chamber 30 will be reduced. There will also be a corresponding increase in the flow of cold water into the mixing chamber 30, and accordingly, the temperature of the mixed water flowing through the outlet 4 is reduced.

Similarly, if the valve shuttle is moved to right shown by the arrow 36, it will cause a reduction in the flow of cold water into the mixing chamber whilst causing a corresponding increase in the flow of hot water. As a result, this causes an increase in the mixed water temperature.

The valve shuttle 34 and the hot and cold ports 32, 33 are designed so that the total unblocked port area (i.e. the unblocked area of the hot port 32 combined with the unblocked area of the cold port 33) remains constant. As a result, the volume of water flowing into the mixing chamber 31 remains substantially constant so that, in turn, the flow of mixed temperature water from the outlet 4 remains substantially constant, irrespective of the position of the valve shuttle 34.

Movement of the valve shuttle 34 is controlled using the motor 6A. This is achieved by having the motor 6A coupled to a gearbox 37, that has an output shaft 38 that is in turn coupled to an arm 39. The arm 39 is supported by the support 41 such that, in use, action of the motor 6A causes the arm 39 to rotate around the axis of the gearbox output shaft 38 so as to move the valve shuttle 34 in the direction of the arrows 35, 36. The mixing chamber is sealed near the gearbox 37 using seals 40, as shown to prevent water leaking from the mixing chamber.

In use the processor 18 is adapted to determine the mixed water temperature from the first temperature sensor 10. The processor 18 then compares the determined current mixed water temperature to an ideal mixed water temperature which is stored in the memory 11, as will be explained in more detail below.

If the current mixed water temperature is too high, the processor 18 sends a signal to the motor controller 6 causing the motor 6A to be activated. The motor 6A is activated so as to cause the valve shuttle 34 to move in the direction arrow 35, thereby reducing the flow of hot water into the mixing chamber 30. Similarly, the flow of cold water into the mixing chamber 30 increases, thereby reducing the mixed water temperature of water flowing from the outlet 4.

Similarly, if the mixed water temperature at the outlet 4 is below the ideal mixed water temperature then the processor 18 sends a signal to the motor controller causing the motor 6A to be activated so as to move the valve shuttle in the direction of the arrow 36. This in turn increases the flow of hot water into the mixing chamber 30 and decreases the flow of cold water into the mixing chamber 30, thereby increasing the hot water temperature at the outlet 4.

In addition to the basic operation outlined above, the TMV 1 has a number of additional operating features that will now be described in more detail.

Temperature Sensors

In order to ensure that the TMV is able control the water temperature effectively it is necessary to ensure that the response time between a temperature change occurring and this being detected and acted upon is minimised.

In view of this, it is preferred to use a temperature sensor that has quick response time.

This can be achieved by using a super-fast small thermistor as the temperature sensors. In this case, the thermistor can be mounted within a stainless steel watertight housing that projects into the fluid whose temperature is to be measured. By ensuring that the housing is watertight ensures that the thermistor does not become exposed directly to the water. Furthermore, the steel has high heat conductivity, thereby ensuring that the temperature of the thermistor corresponds to the temperature of the water, even during rapid temperature fluctuations.

However, it is also possible to use other sensors that may, for example, be mounted in a ceramic package as the ceramic is nonconductive to electricity but conductive to heat, thereby allowing temperature changes to propagate though the packaging material rapidly to the temperature sensor.

Temperature Sensor Positioning

In addition to ensuring that the temperature sensor is able to respond quickly to temperature changes, it is also necessary to ensure that the temperature sensor 10 is suitably positioned. In particular when positioning the mixed water temperature sensor on the outlet 4 necessary to consider both the response time and the temperature variations along the outlet 4.

Testing has revealed that as the sensor is moved along the outlet 4 away from the mixing chamber 30 the response time of the sensor slowed. This is because it takes a finite amount of time for the mixed water to travel from the mixing chamber down along the outlet. Accordingly, as the temperature of the mixed water in the mixing chamber changes, this is not immediately reflected in a change in temperature of the outlet. Accordingly, it is preferable to have the temperature sensor close to the mixing chamber as possible.

However the second factor effecting sensor positioning is the stability of the measurement. The current valve designed, provides a sizeable body of water between the mixing port where the mixed water exits the mixing chamber and the outlet 4. This body of water acts as a temperature damper. That is to say when a short term temperature spike is generated at the mixing port due to, for example, a pressure fluctuation, a large portion of the temperature spike is absorbed by the body of water in the valve. Thus what presents as a dramatic temperature spike at the mixing port can become a moderate spike at the outlet.

If the processor 18 is presented with the dramatic spike information it will produce a dramatic response in valve adjustment in order to compensate. However if the valve is presented with a moderate peak it will produce a moderate response in terms of valve adjustment.

Thus, the optimum sensor position is a compromise between being close enough to the mixing port to have a reasonably short response time, and far enough away to minimise the effect of large short term fluctuations. This optimum positioning needs to be determined by trial for the particular valve body to be used in production.

It will therefore be appreciated that a development of the system described above is to use a fourth temperature sensor (not shown) to monitor the mixed water temperature at the mixed water outlet 4, in addition to the temperature sensor 10. In addition to recording the mixed water temperatures indicated by both the first and fourth temperature sensors the processor 18 would be adapted to compare the temperature readings obtained.

In this case, with the first temperature sensor 10 placed close to the mixing chamber 30, the first temperature sensor can be used to determine whether a temperature rise is in the form of a spike or a protracted rise. The fourth temperature sensor would then be positioned further away, to determine the size of the adjustment that will be required.

The first temperature sensor could also be used to anticipate adjustments to speed up the response time of the control loop.

Baffle

As mentioned above, it is also important that the mixed water temperature sensor gives a stable and accurate reading of the mixed water temperature. One reason for an unstable temperature reading is the lack of proper mixing of the hot and cold water before they reach the mixed water sensor. An unstable mixed water temperature reading will result in poor temperature control.

Accordingly, the above described example utilises a flat baffle 31 which runs across the internal body of the valve parallel with the mixing port. This baffle prevents the hot and cold water from travelling in a straight line from the mixing port to the valve outlet thereby forcing the water to travel up over the barrier and down the other side before reaching the outlet thereby helping to mix the hot and cold water.

It will be appreciated that the electronic TMV could therefore be adapted to incorporate the additional features outlined above with respect to FIGS. 1 to 11. Further additional features will now be described.

Automatic Shut-Off

In this example, the failure detection system 20 can be coupled to the motor controller 6 and the motor 6A to detect any problems with these devices. Thus, for example, when the processor 18 generates a signal which is transferred to the motor controller 6 to cause operation of the motor 6A, the failure detection system 20 will detect the signal and also operate to detect whether the movement of the motor 6A occurs. If no motion of the motor 6A is detected, then the failure detection system 20 will determine that the system has failed and again operate to shut off the mixed outlet using the flow control 19.

Flow Determination

The determination of flow is extremely important in controlling the operation of the motor. For example, as mentioned above, if the TMV 1 is switched off, then with no water flowing through the TMV 1, the temperature of any water remaining in the TMV 1, and hence the temperature of the mixed water outlet 4 will fall. In this case, the processor 18 would detect that the mixed water temperature has fallen to below the ideal mixed water temperature, thereby activating the motor to cause an increase in the mixed water temperature.

As the mixed water temperature would continue to fall, this operation will continue until the hot water port 32 is fully open. At this point, if the flow of water from the TMV 1 is turned on, the mixed water temperature would be near that of the hot water, causing a user to be scolded.

Accordingly, when the valve is inactive, the processor 18 is adapted to send signals to the motor controller 6 to prevent the hot water port 32 being fully opened, as well as ensuring that the alert unit 16 is not activated when the temperature falls outside the predetermined range.

Temperature Compensation

An extension of the flow switch software is the development of flow on/off temp regulating software. This software is designed to compensate for valve position adjustments made during a period of operational status evaluation. This condition can occur when the valve is in the "on" status and the mixed water temperature dips below the target temperature soon after the actual flow has stopped.

As it can take from 10 to 20 seconds for the processor to establish that flow has been stopped a number of valve shuttle 34 position adjustments can be made during this time. If these adjustments are not compensated for before the flow is recommenced then the mixed water temperature can quickly climb above the target temperature.

Accordingly, once the processor has established that flow has stopped the compensation software is implemented to readjust the valve position to the original position held by the valve before flow was stopped.

Multiple Valve Control

Figure 11:
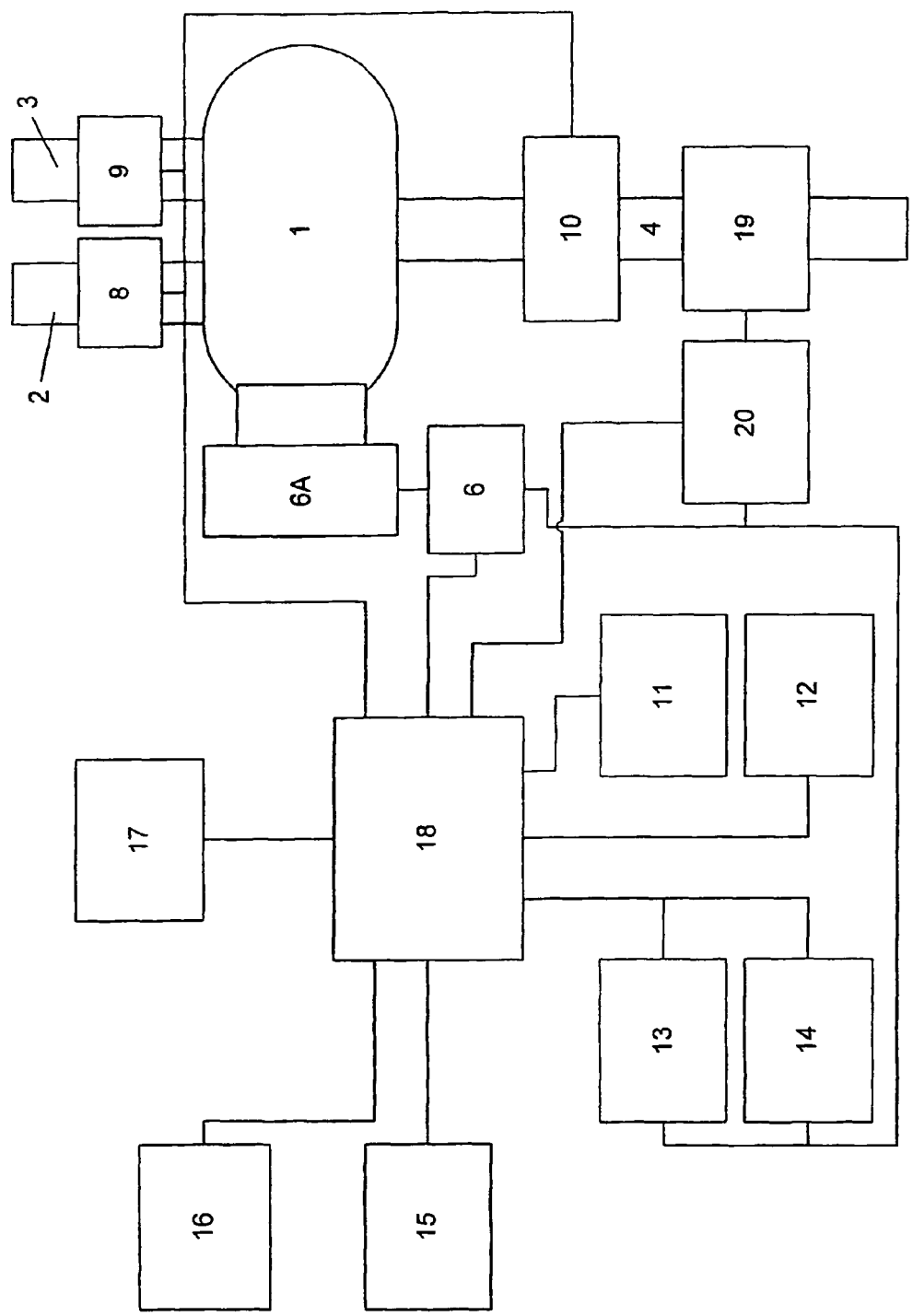
FIG. 11 is a schematic diagram of an example of an electronically controlled TMV according to the present invention.
Figure 12:
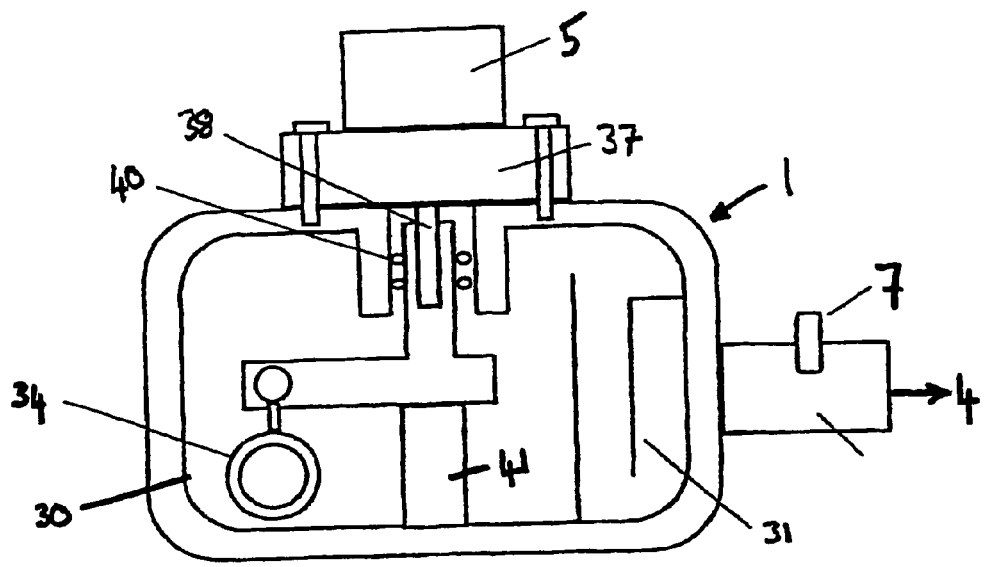
FIG. 12 is a schematic diagram of the internal mechanism of the TMV of FIG. 11 from a first side; and, FIG. 13 is a schematic diagram of the internal mechanism of the TMV of FIG. 11 from a second side.
Figure 13:
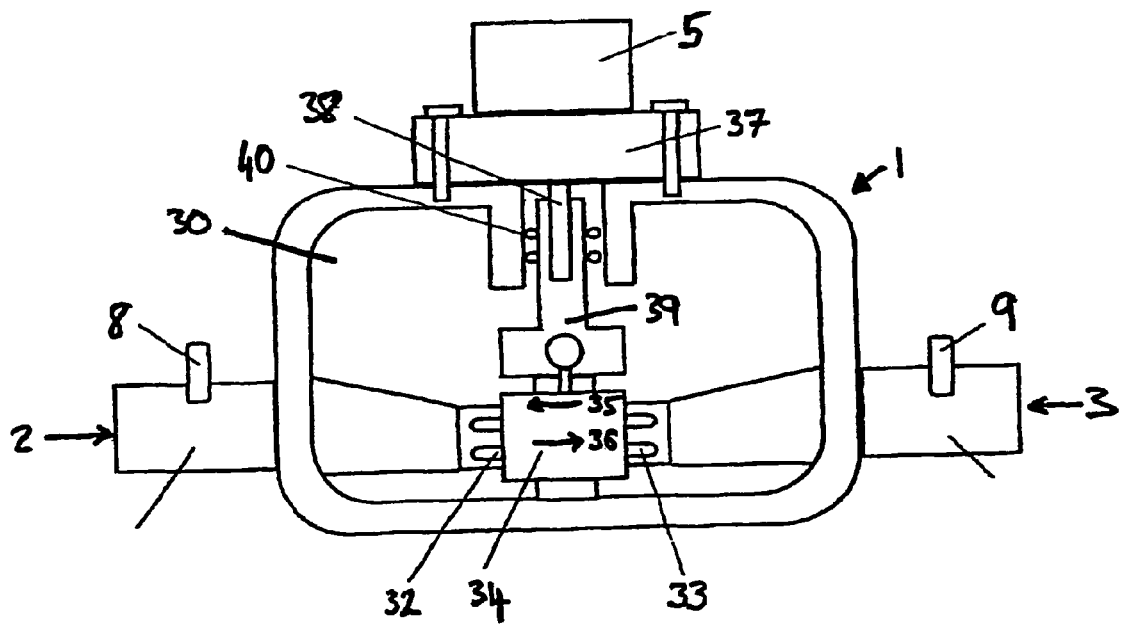

It will be appreciated that multiple electronic TMVs can be monitored and/or controlled centrally using an arrangement similar to that shown in FIG. 11, in which each TMV 1 is an electronically controlled TMV similar to that described with respect to FIGS. 12 to 14.

It will be appreciated by persons skilled in the art that numerous variations and modifications will become apparent. All such variations and modifications which become apparent to persons skilled in the art, should be considered to fall within the spirit and scope of the invention as broadly hereinbefore described.

The invention claimed is:

1. A device for monitoring the operation of a control valve, the control valve being adapted to supply fluid at a predetermined temperature via an outlet, the device comprising:
   a sensor coupled to the outlet and adapted to detect the temperature of the fluid and generate data representative of the detected temperature of the fluid;
   a processor coupled to the sensor, the processor adapted to receive data representative of the temperature of the fluid from the sensor, determine the temperature of the fluid based on the data received from the sensor, and transmit data representative of the determined temperature to an associated indication device;
   an indication device communicatively coupled to the processor, the indication device adapted to receive the determined temperature data and display the determined temperature data;
   a storage means communicatively coupled to the processor and adapted for receiving determined temperature data from the processor and storing the received determined temperature data; and
   a time recording means coupled to the processor and adapted to determine the time at which a temperature was determined.

2. The device according to claim 1 further comprising a transfer means communicatively coupled to the processor and adapted to transfer the determined temperature data stored in the storage means to a remote device.

3. The device according to claim 1 wherein the determined temperature data is transferred via a Bluetooth enabled communications device.

4. The device according to claim 1 wherein the time at which a temperature was determined is associated with the temperature stored in the storage medium.

5. The device according to claim 1 further comprising an temperature comparing means communicatively coupled to the processor, the temperature comparing means adapted to compare the temperature of the fluid with at least one predetermined threshold temperature and determine if the control valve is functioning properly as a result of the determination.

6. The device according to claim 5 further comprising an alert means communicatively coupled to the processor and adapted to generate to generate an alert signal in the event the temperature comparing means determines the control valve is functioning improperly.

7. The device according to claim 6 wherein the temperature comparing means determines that the temperature is above the predetermined threshold temperature and the alert means generates an alert in response to the determination.

8. The device according to claim 6 wherein the temperature comparing means determines that the temperature is below the predetermined threshold temperature and the alert means generates an alert in response to the determination.

9. The device according to claim 6 wherein the alert means generates at least one of an audible alert and a visual alert.

10. The device according to claim 6 wherein the alert means is located remotely from the sensor.

11. The device according to claim 6 wherein the alert means is a portable device.

12. The device according to claim 5 further comprising shutoff means communicatively coupled to the processor and adapted to shutoff the supply of fluid from the outlet in the event the comparing means determines the control valve to be functioning improperly.

13. The device according to claim 1 wherein the indication device includes a display means adapted to display the determined temperature data.

14. The device according to claim 1 wherein the control valve is a thermostatic mixing valve.

15. A device for monitoring the operation of a control valve, the control valve being adapted to supply fluid at a predetermined temperature via an outlet, the device comprising:
   a sensor coupled to the outlet and adapted to detect the temperature of the fluid and generate data representative of the detected temperature of the fluid;
   a processor coupled to the sensor, the processor adapted to receive data representative of the temperature of the fluid from the sensor, determine the temperature of the fluid based on the data received from the sensor, and transmit data representative of the determined temperature to an associated indication device;
   an indication device communicatively coupled to the processor, the indication device adapted to receive the determined temperature data and display the determined temperature data; and a second sensor coupled to the outlet and adapted to detect the temperature of the fluid and generate data representative of the detected temperature of the fluid, wherein:

the processor is adapted to receive data representative of the temperature of the fluid from the sensor and determine the temperature of the fluid based on the data received from the sensor, the temperature comparing means is adapted to compare the temperatures determined from the first sensor and the second sensor, determine if the temperatures differ by more than a predetermined amount, and in the event it is determined that the temperatures differ by more than a predetermined amount, transmit data representing the results of the determination to the indication device; and the indication device is adapted to receive the second determined temperature data and the results of determination by the temperature comparing means, and display the results of the determination by the temperature comparing means.

16. The device according to claim 15 wherein the control valve is adapted to receive a supply of hot fluid at a first inlet and a supply of cold fluid at a second inlet, the control valve operating to mix the hot and cold fluids to thereby supply the fluid at a predetermined temperature.

17. The device according to claim 16 further comprising:
a third sensor coupled to the processor and adapted to detect the temperature of the hot fluid; and
a fourth sensor coupled to the processor and adapted to detect the temperature of the cold fluid, wherein
the processor is adapted to receive data representative of the temperature of the fluid from the third and fourth sensors and determine the temperature of the fluid based on the data received from the sensors.

18. The device according to claim 17 wherein the processor is adapted to determine that the supply of from the outlet has been shut off when at least one of the temperature of the hot fluid decreases by a predetermined amount and the temperature of the cold fluid decreases by a predetermined amount.

19. A control valve for supplying fluid at a predetermined temperature, the control valve comprising:
a hot inlet adapted to receive hot fluid at a temperature equal to or above the predetermined temperature;
a cold inlet adapted to receive cold fluid at a temperature equal to or below the predetermined temperature;
a mixing chamber coupled to the hot and cold inlets and adapted to mix the hot and cold fluids;
an outlet coupled to the mixing chamber and adapted to supply fluid at the predetermined temperature;
a sensor coupled to the outlet and adapted to detect the temperature of the fluid supplied and generate data representative of the detected temperature of the fluid;
a flow controller coupled to the mixing chamber and adapted to control the flow of the hot and cold fluids into the mixing chamber;
a processor coupled to the sensor, the processor adapted to receive data representative of the temperature of the fluid from the sensor and determine the temperature of the fluid based on the data received from the sensor;
a store communicatively coupled to the processor and adapted for receiving determined temperature data from the processor and storing the received determined temperature data; and a time recording means coupled to the processor and adapted to determine the time at which a temperature was determined.

20. The control valve according to claim 19 wherein the flow controller includes a closure member adapted to selectively restrict the flow of fluid into the mixing chamber from the hot and cold inlets.

21. The control valve according to claim 20 wherein the closure member is continuously movable between a first end position in which the hot inlet is substantially open and the cold inlet is substantially closed, and a second end position in which the hot inlet is substantially closed and the cold inlet is substantially open.

22. The control valve according to claim 20 wherein the flow controller includes a motor adapted for moving the closure member, wherein processor transmits instructions to move the closure member in response to the detected temperature.

23. The control valve according to claim 19 further comprising a baffle positioned in the mixing chamber upstream of the outlet and adapted to assist in the mixing of the hot and cold fluids in the mixing chamber.

24. A device for monitoring the operation of a control valve, the control valve being adapted to supply fluid at a predetermined temperature via an outlet, the device comprising:
a sensor coupled to the outlet and adapted to detect the temperature of the fluid and generate data representative of the detected temperature of the fluid;
a processor coupled to the sensor, the processor adapted to receive data representative of the temperature of the fluid from the sensor, determine the temperature of the fluid based on the data received from the sensor, and transmit data representative of the determined temperature to an associated indication device;
an indication device communicatively coupled to the processor, the indication device adapted to receive the determined temperature data and display the determined temperature data;
a store communicatively coupled to the processor and adapted for receiving determined temperature data from the processor and storing the received determined temperature data; and
a time recording means coupled to the processor and adapted to determine the time at which a temperature was determined.

25. The device according to claim 24 further comprising a transfer means communicatively coupled to the processor and adapted to transfer the determined temperature data stored in the store to a remote device.

26. The device according to claim 24 wherein the determined temperature data is transferred via a Bluetooth enabled communications device.

27. The device according to claim 24 wherein the time at which a temperature was determined is associated with the temperature stored in the store.

28. The device according to claim 24 further comprising a temperature comparing means communicatively coupled to the processor, the temperature comparing means adapted for comparing the temperature of the fluid with at least one predetermined threshold temperature and determining if the control valve is functioning properly as a result of the determination.

29. The device according to claim 28 further comprising an alert means communicatively coupled to the processor and adapted for generating an alert signal in the event the temperature comparing means determines the control valve is functioning improperly.

30. The device according to claim 28 further comprising shutoff means communicatively coupled to the processor and adapted to shutoff the supply of fluid from the outlet in the event the comparing means determines the control valve to be functioning improperly.

31. The device according to claim 24 wherein the indication device includes a display means adapted to display the determined temperature data.

32. The device according to claim 24 further comprising a second sensor coupled to the outlet and adapted for detecting the temperature of the fluid and generating data representative of the detected temperature of the fluid, wherein:

the processor is adapted to receive data representative of the temperature of the fluid from the sensor and determine the temperature of the fluid based on the data received from the sensor, the temperature comparing means is adapted to compare the temperatures determined from a first sensor and the second sensor, determine if the temperatures differ by more than a predetermined amount, and in the event it is determined that the temperatures differ by more than a predetermined amount, transmit data representing the results of the determination to the indication device, and the indication device is adapted to receive the second determined temperature data and the results of determination by the temperature comparing means, and display the results of the determination by the temperature comparing means; and wherein the control valve is adapted to receive a supply of hot fluid at a first inlet and a supply of cold fluid at a second inlet, the control valve operating to mix the hot and cold fluids to thereby supply the fluid at a predetermined temperature.

* * * * *